United States Patent [19]

Holmgren et al.

[11] Patent Number: 4,629,110

[45] Date of Patent: Dec. 16, 1986

[54] METHOD FOR MANUFACTURING POWDER-FILLED TUBULAR WELDING ELECTRODES AND A DEVICE FOR PERFORMING THE METHOD

[75] Inventors: Werner Holmgren, Västra Frölunda; Kent Jisbrant, Göteborg, both of Sweden

[73] Assignee: Werner Holmgren, Vastra Frolunda, Sweden

[21] Appl. No.: 779,683

[22] Filed: Sep. 24, 1985

[30] Foreign Application Priority Data

Oct. 3, 1984 [SE] Sweden ............................... 8404938

[51] Int. Cl.⁴ ............................................. B23K 35/40
[52] U.S. Cl. ...................................... 228/148; 141/98
[58] Field of Search ........................... 228/148; 141/198

[56] References Cited

U.S. PATENT DOCUMENTS

| | | | |
|---|---|---|---|
| 3,844,446 | 10/1974 | Solt | 141/198 |
| 4,269,639 | 5/1981 | Lewis | 228/148 |
| 4,555,054 | 11/1985 | Winter et al. | 228/148 |

FOREIGN PATENT DOCUMENTS

| | | | |
|---|---|---|---|
| 101546 | 7/1937 | Australia | 141/198 |
| 633623 | 12/1961 | Canada | 228/148 |
| 572353 | 2/1933 | Fed. Rep. of Germany | 228/148 |
| 27023 | 3/1977 | Japan | 228/148 |

*Primary Examiner*—Nicholas P. Godici
*Assistant Examiner*—Samuel M. Heinrich
*Attorney, Agent, or Firm*—Cushman, Darby & Cushman

[57] ABSTRACT

A method for manufacturing powder-filled tubular welding electrodes made from a continuously fed metallic gutter (16) in which the powder is introduced through a powder conveyor (17) opening in the gutter, which conveyor via a filling conduit (19) arranged inside the gutter will transfer the powder past a welding station (23) for welding the longitudinal edges (25) of the gutter which is formed to a tube (21). The purpose of the invention is to provide a method and a device for manufacturing powder-filled tubular welding electrodes without the powder damaged when it passes the welding station and that the filling of a tube is made under controlled conditions thus that the tube is completely filled concurrently with its feeding through the welding station. This has been solved thereby that a pressurized gas is introduced in the filling conduit (19) for accelerated transport of the powder through the conduit, and that the pressurized gas is evacuated through an evacuation duct (31) provided in the tube (21) the inlet (30) of said duct governing the feeding of the powder, therein that the inlet at too big a powder volume is blocked by the powder, whereupon a counter pressure will be achieved in the filling conduit causing the powder feed to be reduced or completely prevented.

4 Claims, 6 Drawing Figures

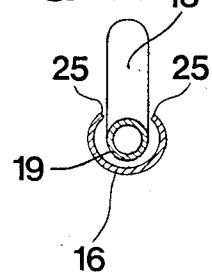
FIG 1
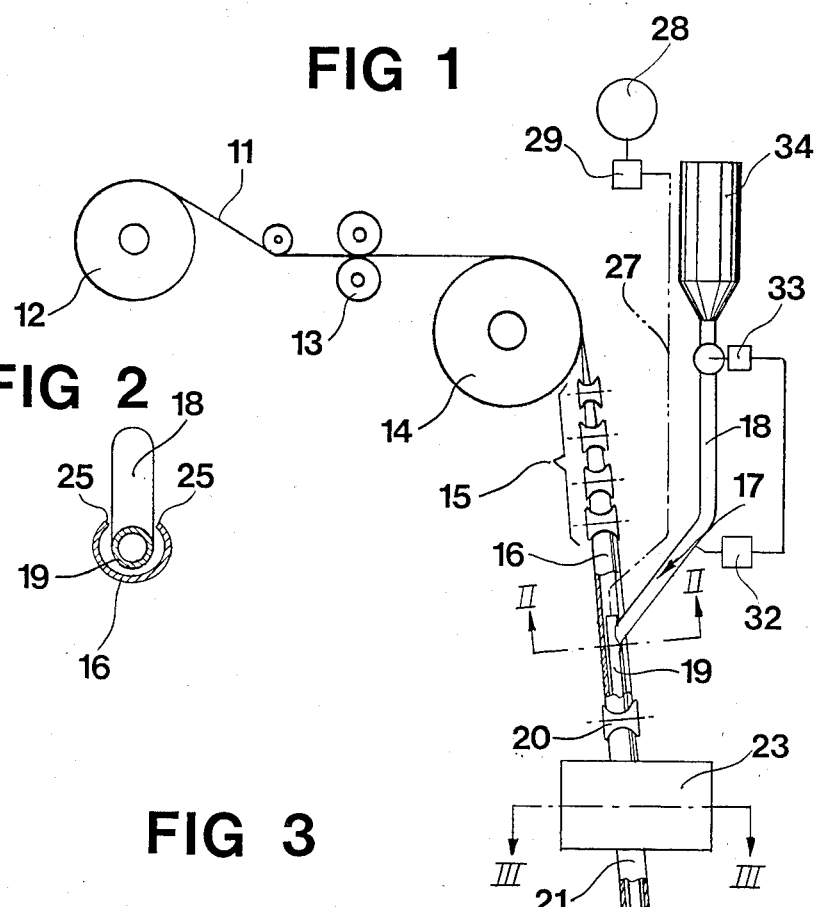
FIG 2
FIG 3
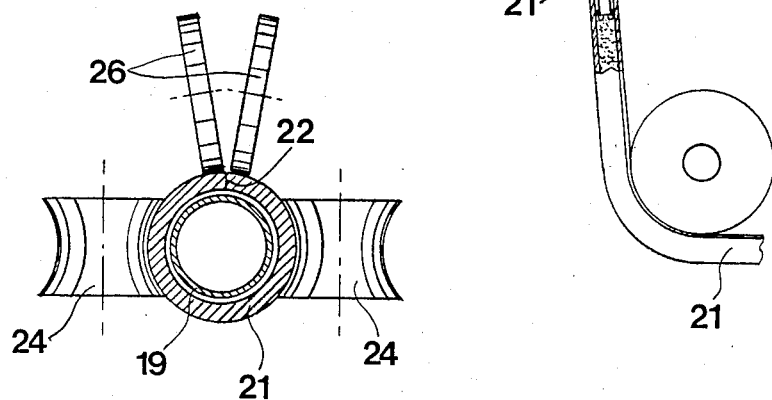

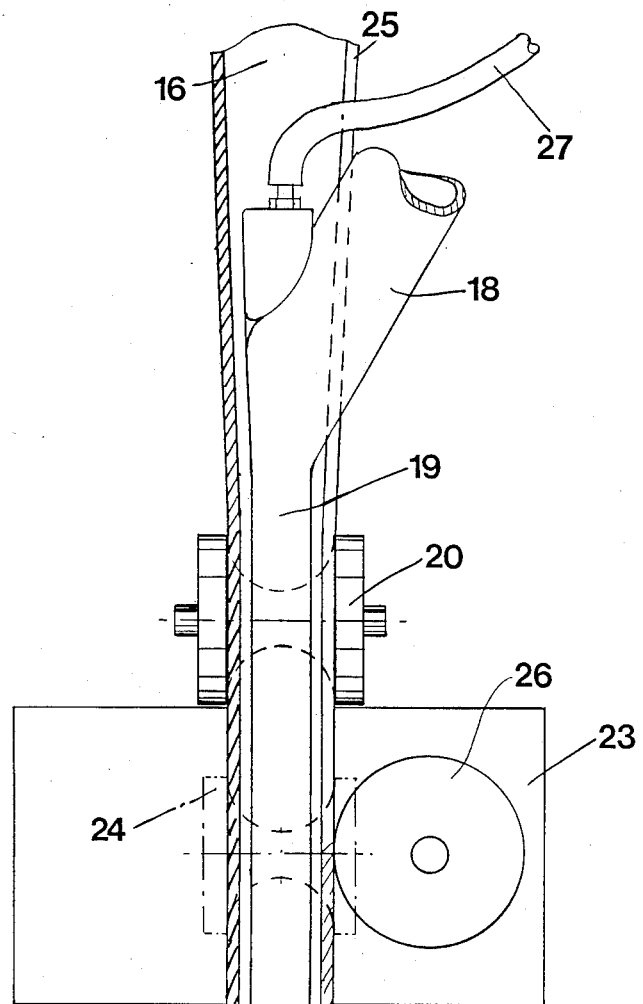
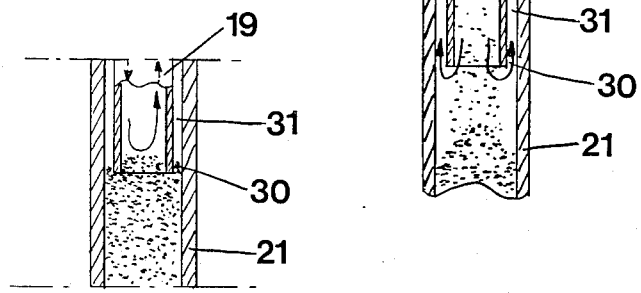
FIG 4
FIG 5

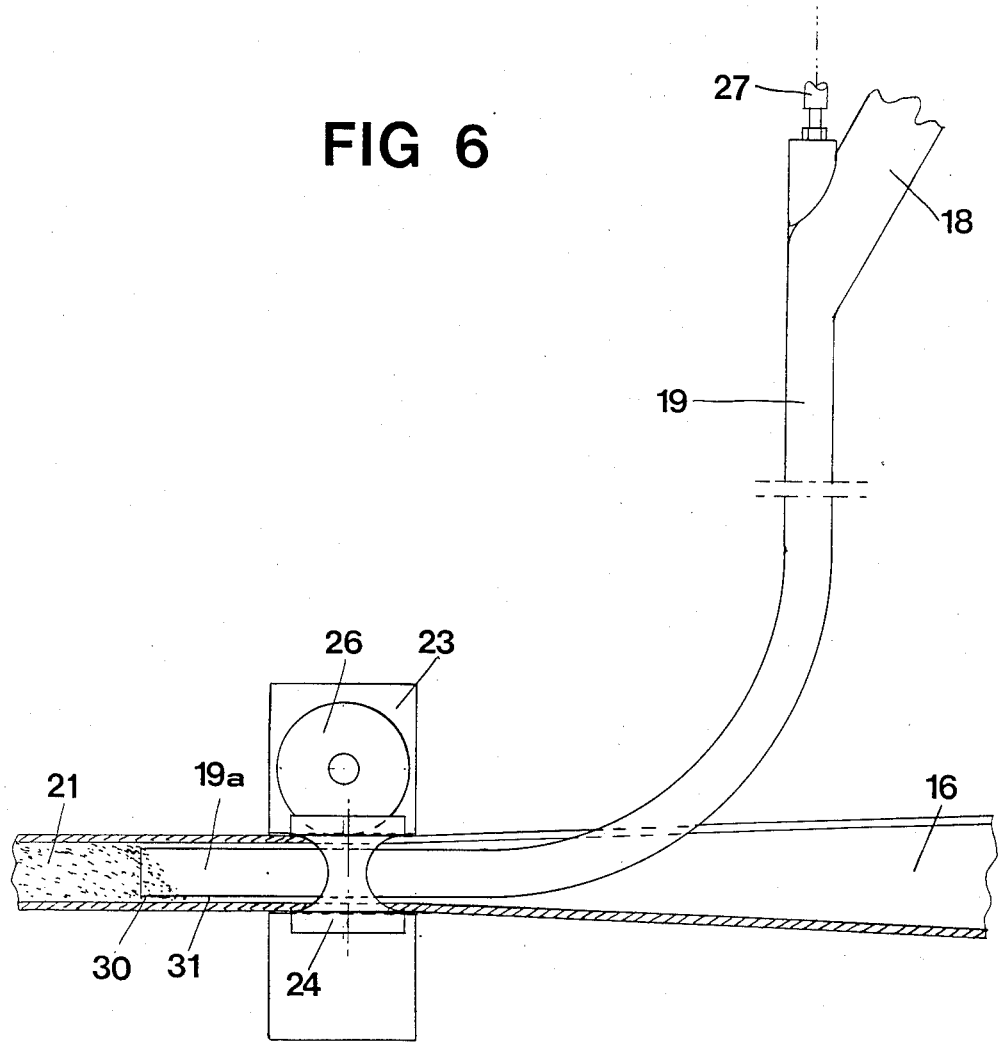

METHOD FOR MANUFACTURING POWDER-FILLED TUBULAR WELDING ELECTRODES AND A DEVICE FOR PERFORMING THE METHOD

The present invention refers to a method for manufacturing powder-filled tubular welding electrodes, made from a continuously fed metallic gutter, in which the powder is introduced through a powder conveyor opening in the gutter, which conveyer via a filling conduit provided within the gutter transfers the powder past a welding station for welding the longitudional edges of the gutter, which is formed to a tube. The invention also refers to a device for manufacturing such welding electrodes in accordance with the method.

BACKGROUND OF THE INVENTION

Manufacturing methods for production of tubular electrodes are earlier known, in which the tubular electrode consists of a tube shaped from a metallic string, the longitudinal seam of which is welded. The problem at the manufacture of such tubes is that the powder during the welding operation will be subjected to such high temperatures that there is a risk that the powder will be damaged by the welding heat. Manufacturing methods have been developed according to which the gutter, before being closed to a tube is filled, with so much powder only, that this will take up a portion of the cross-sectional area of the tube, when the tube passes the welding station. The powder flows preferably past the welding position at a certain distance from this, but in spite of this there is a risk that the powder can be negatively influenced by the welding heat. Furthermore there is no control over that the welded tube is really exactly filled with powder downstream of the welding station or that the powder level is not too high in the tube, whereby it again can be subjected to harmfull heat influence.

PURPOSE AND MOST ESSENTIAL FEATURES OF THE INVENTION

The purpose of the present invention is to provide a method and a device for manufacturing powder-filled tubular welding electrodes without the powder thereby being damaged when it passes the welding station and that the filling of the tube is carried out under such controlled conditions, that the powder level in the tube never can reach the welding station and that the tube is completely filled concurrently with the feeding velocity after the tube has passed the welding station. These tasks have been solved thereby that a pressurized gas is introduced into the filling conduit in order to accelerate the transfer of the powder through the conduit, and that the pressurized gas is evacuated through an evacuation duct provided in the tube, the inlet of which duct governs the feeding of the powder therein that the inlet at too big a powder volume will become blocked by the powder, whereupon a counter pressure will be achieved in the filling conduit, causing the powder feed to be reduced or completely prevented. The device for performing the method is characterized by the features defined in claim 3.

DESCRIPTION OF THE DRAWINGS

FIG. 1 shows schematically an embodiment of a plant for manufacturing of a powder-filled welding electrode according to the invention.

FIG. 2 is a section along line II—II in FIG. 1.

FIG. 3 shows in bigger scale a section along line III—III in FIG. 1.

FIG. 4 shows in bigger scale a detail of a plant according to FIG. 1 at the location of the welding station.

FIG. 5 is a section analogous with FIG. 4 showing a portion of the tube below the welding station.

FIG. 6 shows the plant according to FIG. 1 in a somewhat modified embodiment.

DESCRIPTION OF THE EMBODIMENTS

The manufacture of the welding electrode in many respects is carried out in conventional manner, with a metallic string 11 e.g. a steel belt, as a starting material, such as shown in FIG. 1. The belt is wound off a roll 12 and passes via a calibration device 13 and an intermediate pulley 14 to a shaping station 15 in which the metal string 11 is shaped to an open gutter 16 having a cross-section which is partly circular or oval. In this open gutter 16 is arranged to open a powder conveyor 17 consisting of a comparatively coarse feeding conduit 18 and a considerably thinner filling conduit 19. In a second shaping station 20 the gutter 16 is shaped to a tube 21 the longitudinal seam 22 of which is welded in a welding station 23. The welding station shown in FIGS. 1 and 3 is designed as a resistance seam welding device and incorporates two supporting rollers 24 which press the edges 25 of the tube 21 to contact against each other, and two seam welding rollers 26, but other seam welding methods can also be applied. The tube 21 is fed at a constant speed through the welding station 23 and the continuous welding of the seam 22 is carried out at the same speed.

The filling tube 19 has a cross-section and a dimension somewhat smaller than the internal cross-section of the tube 21 and such a length that is extends past the welding station 23. The filling conduit 19, and preferably its upper part, is provided with a conduit 27 connected thereto and to a pressure air machine 28, a gas source or the like. In the filling conduit is maintained a faint over pressure e.g. 0.5 mm HG by means of a pressure steady-state and regulating member 29. The faint air or gas pressure will bring about a fluidization of the powder grains, which thereby will obtain a cconsiderably improved mobility.

For controlling the powder level below the welding station 23 the tube 21 within the area for the powder level is provided with an inlet 30 for an exhaust duct 31, through which the introduced pressurized air can be exhausted to atmosphere. As long as the powder is allowed freely to fall past the inlet 30 of the exhaust duct 31 the air is free to discharge through the exhaust duct, but if the powder volume should be so great that the powder level will reach the inlet 30 this will be blocked and the pressurized air must turn about in the filling conduit 19 and/or in the feed conduit 18, in which a counter pressure will be generated, which prevents a continued discharge of powder through these conduits. Excess air can then escape through an air purger conduit in the powder container 34 of the plant.

It is possible to let one of the conduits 18,19 be connected to a pressure sensitive member 32, which at a pressure increase in the system will close or reduce the powder feed via a regulating device 33 connected to the outlet conduit of the powder container 34.

The continuous manufacture of the powder-filled tubular welding electrodes is preferably governed thus that the powder level at even intervals will reach the inlet of the exhausting conduit 31 thus that a continuous indication of a coefficient of fullness is obtained.

In the embodiment shown in FIGS. 1–4 the gutter 16 and the resulting tube 21 have a vertical or nearly vertical extention which facilitates the powder introduction. As the process following upon the powder introduction and welding operation i.e. the milling and drawing of the tube to the desired electrode diameter is preferably made with the tube in a horizontal position it is possible after addition of pressurized air to the powder filling conduit 19 to bend the filling conduit from a vertical to a horizontal or nearly horizontal position resp., such as shown in FIG. 6. The horizontal portion 19a of the filling conduit has been located in the gutter 16 which is also horisontally arranged and it extends a short distance past the welding station 23. The pressurized air in this embodiment thus has also a function of transporting the powder past the welding station.

In both embodiments the exhausting duct 31 is formed by the annular slot space between the filling conduit 19 and the internal envelope surface of the tube 21, but it is of course also possible to arrange a separate exhaust duct in the filling conduit 19. The inlet opening of the exhaust duct is preferably located in level with the outlet of the filling conduit but it can also be situated at a distance away from the outlet opening of the filling conduit 19.

Due to the fact that the pressurized air will accelerate the powder and with increased velocity blow this past the welding station 23. The harmful influence of the welding heat on the powder is reduced to a minimum, which means that the quality of the powder is not impaired.

What we claim is:

1. A method for manufacturing powder-filled tubular welding electrodes, made from a continuously fed metallic gutter, in which the powder is introduced through a powder conveyor, said powder conveyor having a filling conduit including a discharge end with at least a portion of said filling conduit and said discharge end being located within the gutter downstream of a welding station for welding the longitudinal edges of the gutter to form a tube, the improvement comprising introducing a pressurized gas into said filling conduit to accelerate the transfer of powder through said conduit and exhausting the pressurized gas through an exhaust passage provided between said filling conduit and said formed tube, locating an entrance to said exhaust passage immediately adjacent to said discharge end of said filling conduit, whereby blockage of said discharge outlet of said filling conduit will be effective to throttle the discharge of powder from said filling conduit.

2. The method as claimed in claim 1 wherein pressure increase in said filling conduit is detected by a pressure detector and including the step of utilizing a signal from said pressure detector to control the powder feed.

3. A device for manufacturing powder-filled tubular welding electrodes where a said electrode is formed by first forming a metallic gutter which is continuously fed through shaping means and a welding station, said device comprising a powder conveyor means including a filling conduit having a discharge end, a pressurized gas supply means connected to said filling conduit at an end thereof remote from said discharge end, the length of said filling conduit being such that said remote portion of said filling conduit is positionable on one side of the welding station with said discharge end of said filling conduit disposed on the opposite side of said filling station, said shaping means being effective to close said metallic gutter to form a closed tube and said filling conduit adjacent said discharge end thereof defining with the interior of said tube an exhaust passage for the pressurized air delivered from said discharge end of said filling conduit.

4. A device for manufacturing powder-filled tubular welding electrodes,
comprising in combination a roll containing a metallic belt, a shaping device arranged to wind off said metallic belt from said roll and incorporating a number of shaping rollers arranged after each other in the direction of movement of said metallic belt, first ones of said shaping rollers being arranged to form said metallic belt into a gutter and last of said shaping rollers being arranged to form said gutter into a tube, a welding station being arranged after said shaping station and being arranged to weld the longitudinal edges of said tube, a stationary filling conduit arranged to project into said gutter and to extend inside said gutter and into said tube to a position after said welding station, said filling conduit being connected to a powder container from which powder is fed through said filling conduit into said tube, a source of a gaseous medium under pressure being connected to said filling conduit via a second conduit, an exhaust duct being arranged in said tube for exhausting said pressurized gaseous medium from said tube, an inlet of said exhaust duct being located in said tube in the area wherein the powder introduced via said filling conduit will vary in level during the filling and manufacturing operations.

* * * * *